(12) United States Patent
Maeda et al.

(10) Patent No.: US 8,074,182 B2
(45) Date of Patent: Dec. 6, 2011

(54) WORK PROCEDURE DISPLAY METHOD AND SYSTEM, PRODUCTION PROCESS MANAGEMENT METHOD AND SYSTEM, AND COMPUTER PROGRAM OF THE SAME

(75) Inventors: Takayo Maeda, Himeji (JP); Tomomi Takaba, Nagoya (JP); Masakazu Kondo, Kobe (JP); Kunio Ishikawa, Akashi (JP)

(73) Assignee: Sysmex Corporation, Kobe (JP)

( * ) Notice: Subject to any disclaimer, the term of this patent is extended or adjusted under 35 U.S.C. 154(b) by 730 days.

(21) Appl. No.: 12/218,596

(22) Filed: Jul. 16, 2008

(65) Prior Publication Data

US 2009/0055741 A1    Feb. 26, 2009

(30) Foreign Application Priority Data

Jul. 18, 2007 (JP) ................................. 2007-186842
Jul. 18, 2007 (JP) ................................. 2007-186885

(51) Int. Cl.
  *G06F 3/00* (2006.01)
  *G06F 3/048* (2006.01)

(52) U.S. Cl. ........ 715/800; 715/762; 715/763; 715/771; 715/799; 715/801

(58) Field of Classification Search .................. 715/762, 715/763, 771, 799, 800, 801

See application file for complete search history.

(56) References Cited

U.S. PATENT DOCUMENTS

| | | | | |
|---|---|---|---|---|
| 5,647,009 A * | 7/1997 | Aoki et al. | ..................... | 382/100 |
| 5,936,625 A * | 8/1999 | Kahl et al. | ..................... | 715/775 |
| 6,224,385 B1 * | 5/2001 | Nitta et al. | ..................... | 434/219 |
| 6,285,369 B1 * | 9/2001 | Kross et al. | ..................... | 345/419 |
| 6,477,437 B1 * | 11/2002 | Hirota | ............................. | 700/95 |
| 6,629,065 B1 * | 9/2003 | Gadh et al. | ........................ | 703/1 |
| 7,360,158 B1 * | 4/2008 | Beeman | ........................ | 715/705 |
| 7,945,863 B1 * | 5/2011 | Reid et al. | ..................... | 715/797 |
| 2007/0040763 A1 * | 2/2007 | Lyu | ................................. | 345/1.3 |
| 2007/0236509 A1 * | 10/2007 | Eldridge et al. | .............. | 345/619 |
| 2007/0240070 A1 * | 10/2007 | Eldridge et al. | .............. | 715/763 |
| 2008/0012846 A1 * | 1/2008 | Jung et al. | ..................... | 345/418 |
| 2008/0017619 A1 * | 1/2008 | Yamakawa et al. | ...... | 219/121.81 |

FOREIGN PATENT DOCUMENTS

JP   2001-265420   9/2001

* cited by examiner

*Primary Examiner* — Tuyetlien Tran
*Assistant Examiner* — Shashi Becker
(74) *Attorney, Agent, or Firm* — Brinks Hofer Gilson & Lione

(57) ABSTRACT

A work procedure display method of displaying a work procedure on a work object by a computer displaying a moving image, the method comprising: (a) displaying an entire image of the work object so that start of work is recognizable by a worker; (b) increasing display magnification of the work object so that a working target site of the work object is displayed in an enlarged manner; (c) displaying a moving image showing content of work; (d) displaying an image for the worker to recognize end of work; and (e) accepting instruction to complete the work; wherein steps (a) to (d) are repeatedly executed until instruction to complete the work is accepted, is disclosed. A work procedure display method and system and computer program of the same is also disclosed.

9 Claims, 15 Drawing Sheets

WORK PROCEDURE DISPLAY METHOD AND SYSTEM, PRODUCTION PROCESS MANAGEMENT METHOD AND SYSTEM, AND COMPUTER PROGRAM OF THE SAME

RELATED APPLICATIONS

This application claims priority under 35 U.S.C. §119 to Japanese Patent Application No. JP2007-186842 filed on Jul. 18, 2007 and Japanese Patent Application No. JP2007-186885 filed on Jul. 18, 2007, the entire contents of which are hereby incorporated by reference.

FIELD OF THE INVENTION

The present invention relates to work procedure display method and system, production process management method and system, and a computer program of the same.

BACKGROUND

It is important for the worker to record the work result of each working process of sequentially performing each working process in order to manage the production process. Thus, conventionally, the worker inputs the work result to the computer for every termination of each working process.

Japanese Laid-Open Patent Publication No. 2001-265420 discloses a work instruction manual display system for displaying on the computer an image that serves as the work instruction manual indicating the information necessary for work such as points and procedures of work of product production etc. The worker can perform an accurate and efficient production work by referencing the work instruction manual.

When assembling a relatively small part in the device body, if the entire device body is in the image that serves as the work instruction manual, the display of an important area in work such as the part to be assembled and the assembly position of the relevant part in the device body is small, and becomes difficult to be recognized by the worker.

If only the important area in work such as the part to be assembled and the assembly position of the relevant part in the device body is displayed in an enlarged manner, it becomes difficult to understand which portion of the device body the assembly position is located, and the assembly work becomes difficult to be carried out.

The inventor aims to facilitate the understanding of the worker by displaying the work in moving image. However, when attempting to constantly display the moving image of the work content during work, the moving image is repeatedly displayed until the worker terminates the work, where it becomes difficult to recognize which portion of the moving image is the beginning and the end of the work if the mobbing image is repeatedly displayed.

SUMMARY OF THE INVENTION

The scope of the present invention is defined solely by the appended claims, and is not affected to any degree by the statements within this summary.

A first aspect of the present invention is a work procedure display method of displaying a work procedure on a work object by a computer displaying a moving image, the method comprising: (a) displaying an entire image of the work object so that start of work is recognizable by a worker; (b) increasing display magnification of the work object so that a working target site of the work object is displayed in an enlarged manner; (c) displaying a moving image showing content of work; (d) displaying an image for the worker to recognize end of work; and (e) accepting instruction to complete the work; wherein steps (a) to (d) are repeatedly executed until instruction to complete the work is accepted.

A second aspect of the present invention is a work procedure display system, for displaying a work procedure on a work object by displaying a moving image, including a memory under control of a processor, the memory storing instructions enabling the processor to carry out operations, comprising the steps of: (a) displaying an entire image of the work object so that start of work is recognizable by a worker; (b) increasing display magnification of the work object so that a working target site of the work object is displayed in an enlarged manner; (c) displaying a moving image showing content of work; (d) displaying an image for the worker to recognize end of work; and (e) accepting instruction to complete the work; wherein steps (a) to (d) are repeatedly executed until instruction to complete the work is accepted.

A third aspect of the present invention is a computer program product, comprising: a computer readable medium; and instructions, on the computer readable medium, adapted to enable a general purpose computer to perform operations, comprising: (a) displaying an entire image of the work object so that start of work is recognizable by a worker; (b) increasing display magnification of the work object so that a working target site of the work object is displayed in an enlarged manner; (c) displaying a moving image showing content of work; (d) displaying an image for the worker to recognize end of work; and (e) accepting instruction to complete the work; wherein steps (a) to (d) are repeatedly executed until instruction to complete the work is accepted.

A fourth aspect of the present invention is a production process management method of managing a production process including a plurality of working processes, the method comprising: (a) displaying a non-final work procedure image describing a non-final work procedure on a work object in a predetermined working process; (b) displaying a final work procedure image describing a final work procedure on the work object in the working process; (c) accepting input of completion of the display of the non-final work procedure image or the final work procedure image; (d) switching the displayed non-final work procedure image to a non-final work procedure image to be displayed next in the working process or the final work procedure image when the input of completion of the display of the non-final work procedure image is accepted; and (e) accepting input of information indicating the result of the working process when the input of completion of the display of the final work procedure image is accepted.

A fifth aspect of the present invention is a production process management system for managing a production process including a plurality of working processes, including a memory under control of a processor, the memory storing instructions enabling the processor to carry out operations, comprising: (a) displaying a non-final work procedure image describing a non-final work procedure on a work object in a predetermined working process; (b) displaying a final work procedure image describing a final work procedure on the work object in the working process; (c) accepting input of completion of the display of the non-final work procedure image or the final work procedure image; (d) switching the displayed non-final work procedure image to a non-final work procedure image to be displayed next in the working process or the final work procedure image when the input of completion of the display of the non-final work procedure image is accepted; and (e) accepting input of information indicating the result of the working process when the input of completion of the display of the final work procedure image is accepted.

A sixth aspect of the present invention is a computer program product, comprising: a computer readable medium; and instructions, on the computer readable medium, adapted to enable a general purpose computer to perform operations, comprising: (a) displaying a non-final work procedure image describing a non-final work procedure on a work object in a predetermined working process; (b) displaying a final work procedure image describing a final work procedure on the work object in the working process; (c) accepting input of completion of the display of the non-final work procedure image or the final work procedure image; (d) switching the displayed non-final work procedure image to a non-final work procedure image to be displayed next in the working process or the final work procedure image when the input of completion of the display of the non-final work procedure image is accepted; and (e) accepting input of information indicating the result of the working process when the input of completion of the display of the final work procedure image is accepted.

DETAILED DESCRIPTION OF THE PREFERRED EMBODIMENTS

The preferred embodiments of the present invention will be described hereinafter with reference to the drawings.

Figure 1:
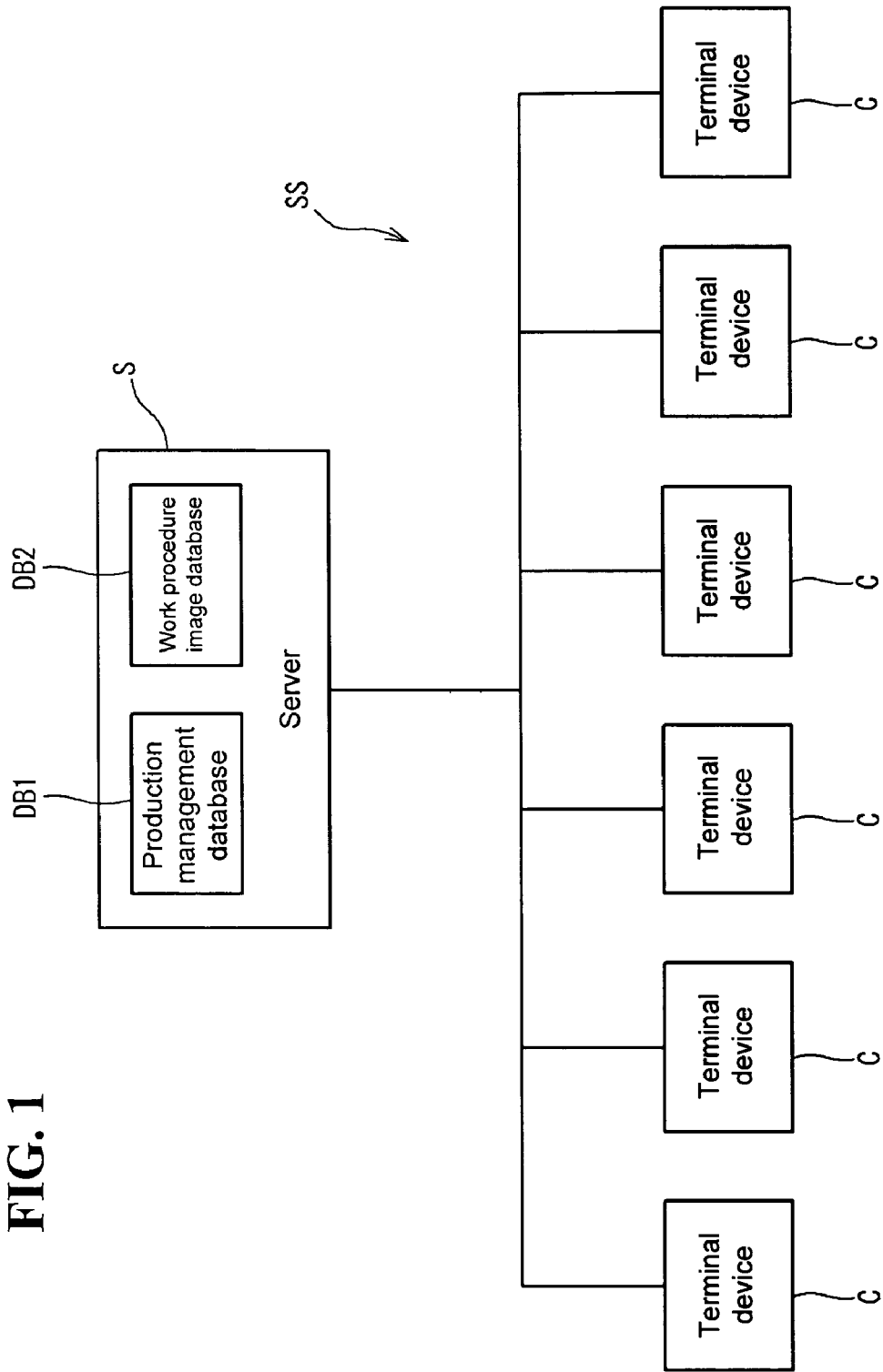
FIG. 1 is an overall view of a production management system.

FIG. 1 shows a network configuration of a production management system SS in a factory. The production management system SS is configured by connecting a server (storage unit) S storing a production management database DB1 and a work procedure image database DB2, and one or a plurality of terminal devices C used by the worker by a network such as LAN.

Figure 2:
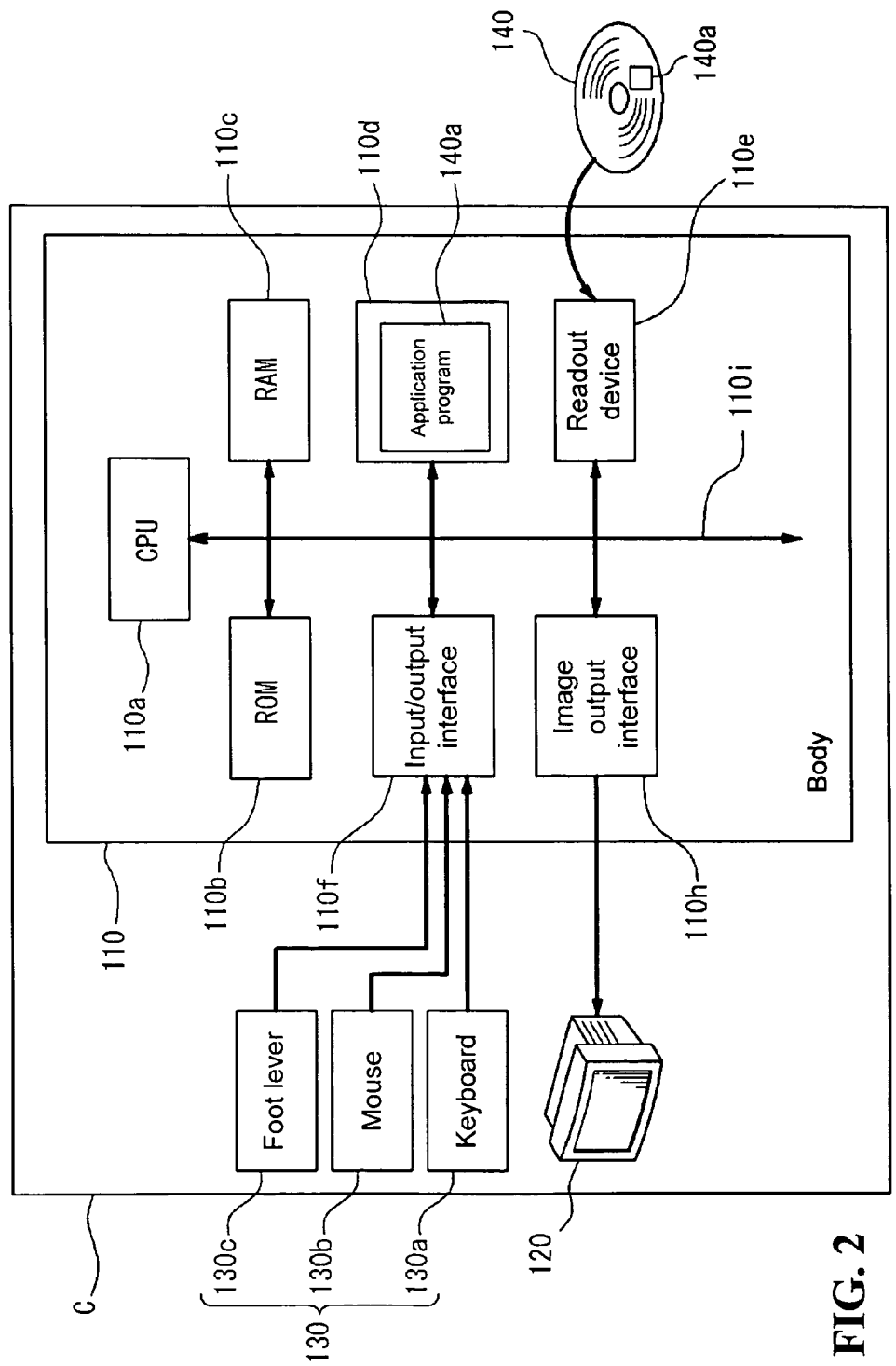
FIG. 2 is a hardware configuration view of a terminal device.

FIG. 2 is a block diagram showing a hardware configuration of the terminal device C. The terminal device C is configured by a computer mainly including a body 110, a display 120, and an input device 130.

The body 110 is mainly configured by a CPU 110a, a ROM 110b, a RAM 110c, a hard disc 110d, a readout device 110e, an input/output interface 110f, and an image output interface 110h, wherein the CPU 110a, the ROM 110b, the RAM 110c, the hard disc 110d, the readout device 110e, the input/output interface 110f, and the image output interface 110h are data communicably connected by a bus 110i.

The CPU 110a can execute computer programs stored in the ROM 110b and computer programs loaded in the RAM 110c.

An application program 140a for realizing the function as the terminal in the production management system is executed by the CPU 110a.

The ROM 110b is configured by mask ROM, PROM, EPROM, EEPROM, and the like, and is recorded with computer programs to be executed by the CPU 110a, data used for the same, and the like.

The RAM 110c is configured by SRAM, DRAM, and the like. The RAM 110c is used to read out the computer programs recorded on the ROM 110b and the hard disc 110d. The RAM 110c is used as a work region of the CPU 110a when executing the computer programs.

The hard disc 110d is installed with various computer programs to be executed by the CPU 110a such as operating system and application program, as well as data used in executing the computer program.

The read-out device 110e is configured by flexible disc drive, CD-ROM drive, DVD-ROM drive, and the like, and is able to read out computer programs and data recorded on a portable recording medium 140. A computer program for causing the computer to function as a terminal of the production management system is stored in the portable recording medium 140, wherein the computer can read out the necessary application program 140a from the portable recording medium 140, and can install the application program 140a and the like to the hard disc 110d.

The computer program such as application program 140a can be not only provided by the portable recording medium 140, and but also provided through electrical communication line (wired or wireless) from external devices communicatably connected with the computer through the electrical communication line. For instance, the application program 140a and the like may be stored in the hard disc of the server computer providing the application program on the Internet, so that the computer can access the server computer to download the computer program and install the same in the hard disc 110d.

Operating system providing graphical user interface environment such as Windows (registered trademark) manufactured and sold by US Microsoft Co. is installed in the hard disc 110d. The computer program described in the present embodiment is assumed to operate on the operating system.

The input/output interface 110f is configured by serial interface such as USB, IEEE1394, RS-232C; parallel interface such as SCSI, IDE, IEEE1284; analog interface such as D/A converter, A/D converter, and the like. The input/output interface 110f is connected with an input device 130 including a keyboard 130a, a mouse 130b, and/or foot lever (foot operation unit) 130b, so that the user can input to the computer by using the input device 130.

The image output interface 110h is connected to the display 120 configured by LCD, CRT, or the like, and is configured to output an image signal corresponding to the image data provided from the CPU 110a to the display 120. The display unit 120 displays the image (screen) according to the input image signal.

The hardware configuration of the server S is substantially the same as the hardware configuration of the terminal device C excluding the foot lever 130c.

Figure 3:
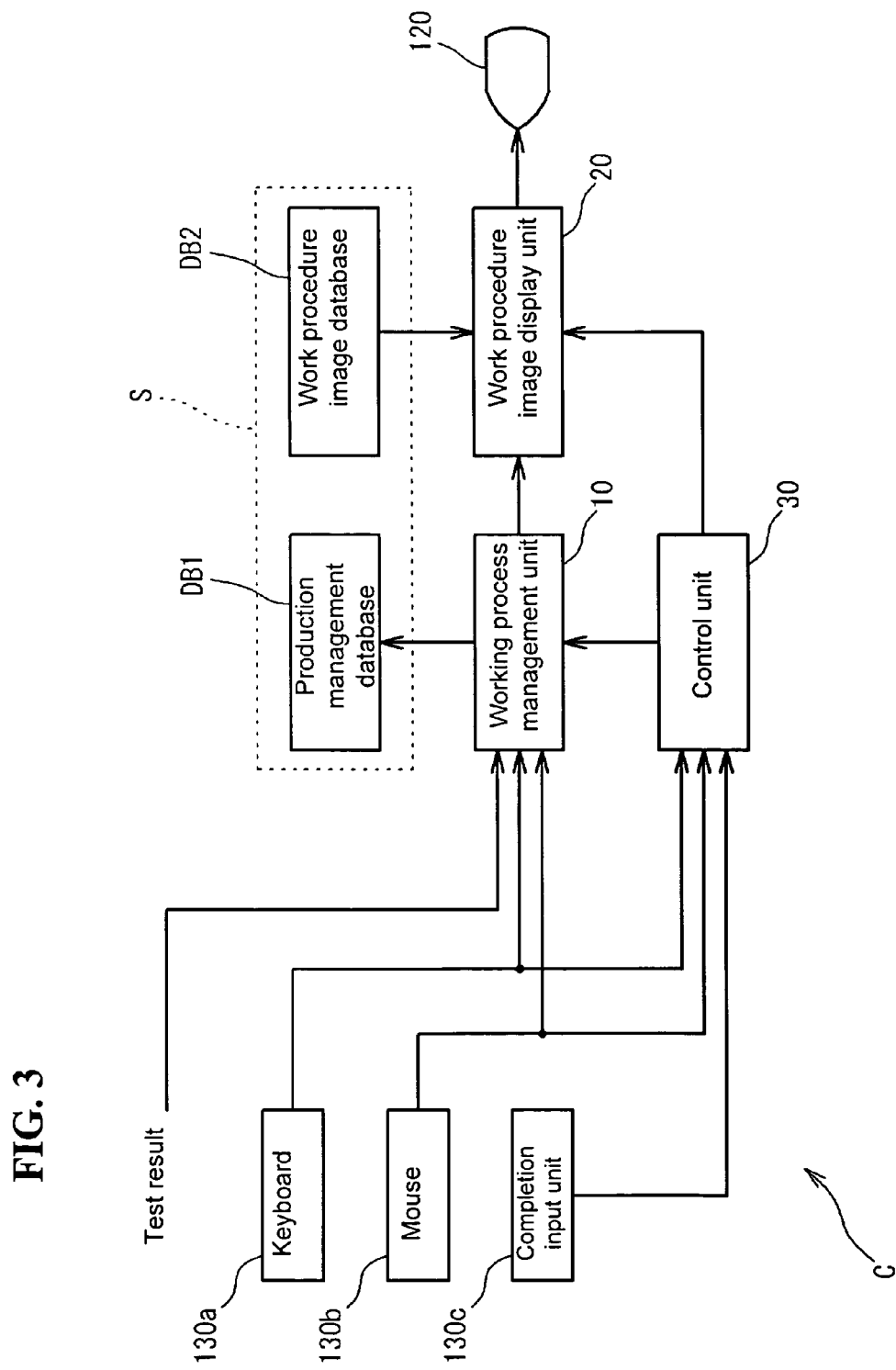
FIG. 3 is a function block diagram of the terminal device.

FIG. 3 shows a function block diagram of the terminal device C realized by the application program etc.

As shown in FIG. 3, the terminal device C includes a working process management unit 10 and a work procedure image display unit 20. The working process management unit 10 accesses the production management database DB1 of the server S, and performs recording of information related to each working process in the production process.

The working process management unit 10 accepts input of work result, defect information and the like from an input device such as keyboard 130a or mouse 130b, and records the accepted information to the production management database DB1. The working process management unit 10 can also acquire through communication information such as test result from product to be worked or test device of the product, and can record the acquired information to the production management database DB1.

The work procedure image display unit 20 accesses the work procedure image database DB2 of the server S, acquires an image (moving image or still image) showing the work procedure of each working process, and displays the image on the display 120.

Furthermore, in the production management system of the present embodiment, a control unit 30 to coordinate the working process management unit 10 for performing product management and the work procedure image display unit 20 for showing the work procedure to the worker.

Figure 4A:
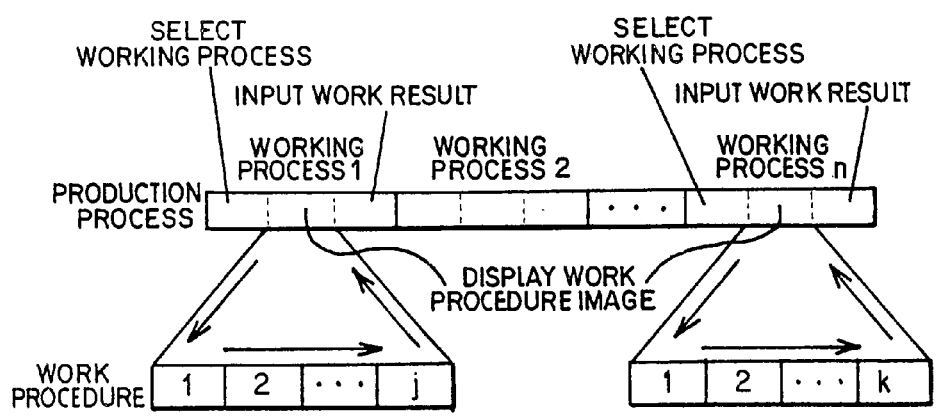
FIG. 4A shows a production process including a plurality of working processes.

FIG. 4A shows a flow of production process on a certain product to be produced. The production process includes a plurality of working processes 1 to n, wherein each working process is the minimum unit of management by the working process management unit 10.

Figure 4B:
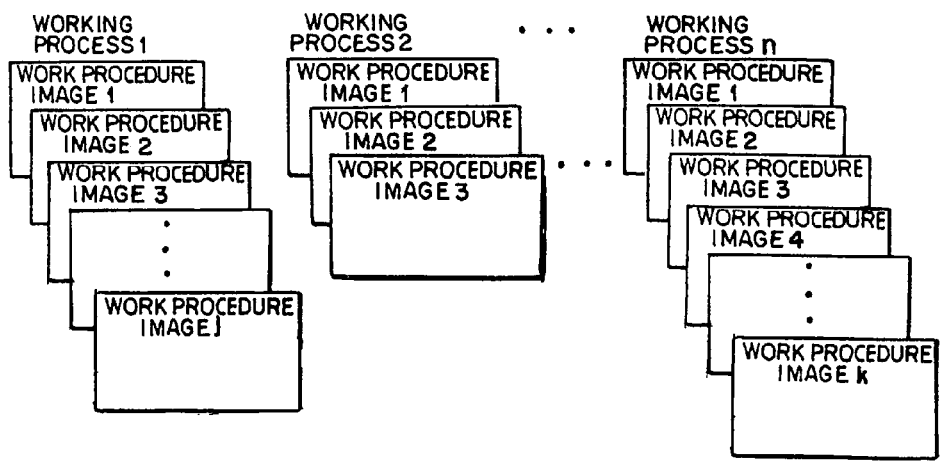
FIG. 4B shows a work procedure image corresponding to each working process.

As shown in FIG. 4B, each working process includes one or a plurality of work procedures, wherein a work procedure image is prepared for each work procedure. That is, one or a plurality of work procedure images are associated to each working process and stored in the work procedure image database DB2.

One working process is a work of assembling a certain part A to a target product being assembled. The work procedure actually performed by the worker to assemble the part A is (1) attaching and screw-fitting the part A to the target product, (2) performing wiring of the part A and the target product, (3) performing piping of the part A and the target product, and (4) performing a test for operation check, and thus one working process often includes a plurality of work procedures.

In the present embodiment, the work procedure image is prepared for each work procedure. For instance, with respect to one working process of assembling the part A, a plurality of work procedure images of (1) work procedure image describing the manner of attaching and screw-fitting the part A to the target product, (2) work procedure image describing the manner of wiring the part A and the target product, (3) work procedure image describing the manner of piping the part A and the target product, and (4) work procedure image describing the manner of performing a test for operation check are prepared.

In one working process of assembling the part A, each work procedure constituting the one working process is a different work, and thus the work of the worker is facilitated by preparing the work procedure image for each work procedure. That is, the worker performs the corresponding work while displaying the work procedure image, and switches to the next work procedure image after the work is completed, and performs the next work, so that the defined work procedures can be reliably and sequentially implemented.

As a production management of the present embodiment, all of the work procedures (1) to (4) for assembling the part A to the target product being assembled are handled as one working process.

If one whole working process is to be explained with one image, a great amount of work procedures are to be explained in one image, and the display becomes inappropriate to sequentially and reliably implement the defined work procedures. In the present embodiment, the work procedure image is sequentially displayed in units of work procedure segmentalized from one working process, and thus the defined work procedures can be reliably and sequentially implemented easily.

The production management may be carried out in a work procedure unit corresponding to one work procedure image, but the unit of working process to be managed as production management does not necessarily always match with the unit of work procedure to be described in image display to help the work of the worker.

In the production management system of the present embodiment, a plurality of working processes (e.g., attachment working process of part A, attachment working process of part B, attachment working process of part C, and the like) defined from the standpoint of production management are prepared, and a plurality of work procedure images segmentalized from the standpoint of work assistance easiness of the worker are prepared for each working process.

The number of work procedure images contained in each working process is not constant, and the number of images can be flexibly set for every working process. The number of work procedure images corresponding to one working process may be one.

Figure 5:
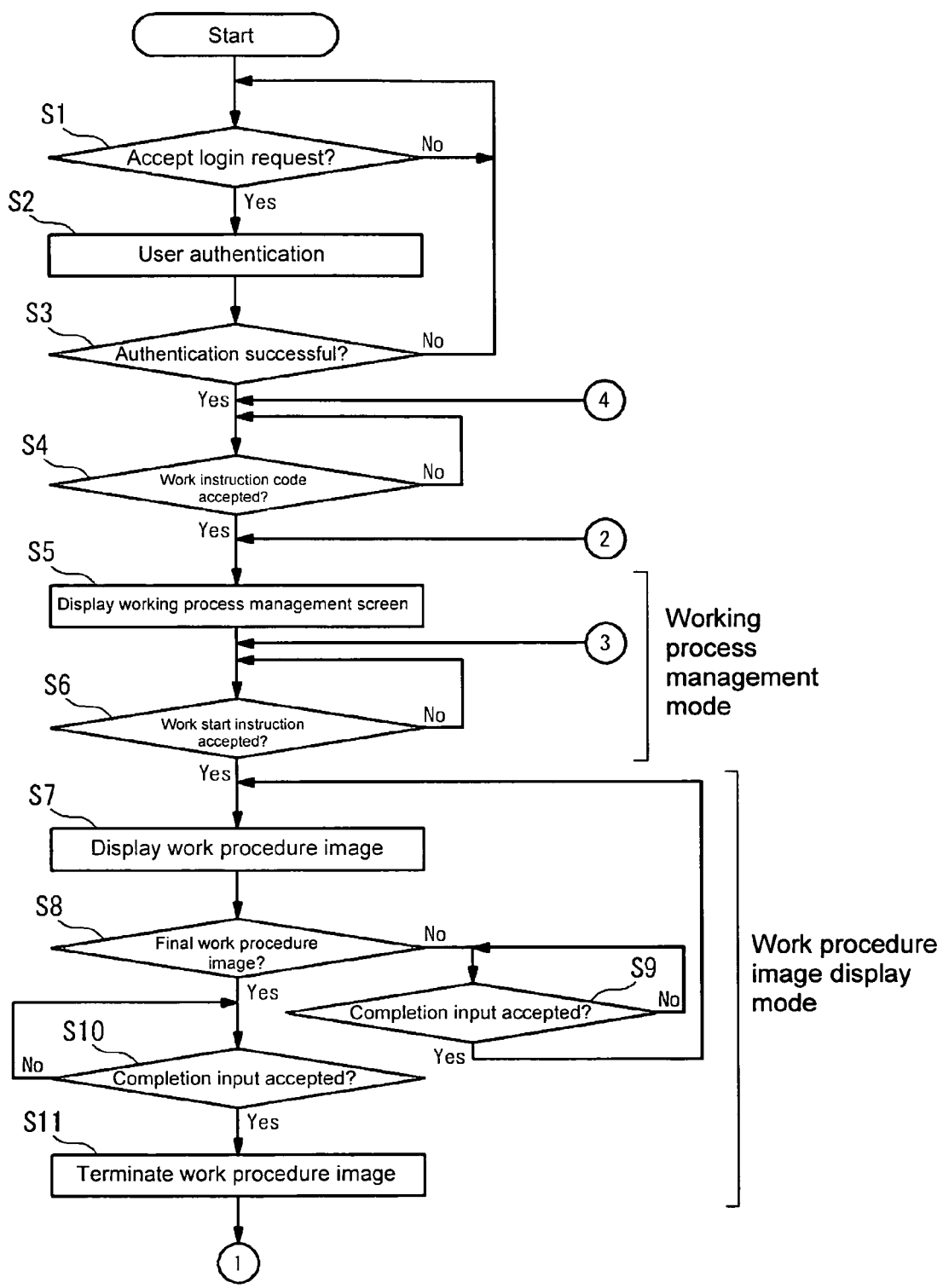
FIG. 5 is a first flowchart showing a processing procedure of the system.
Figure 6:
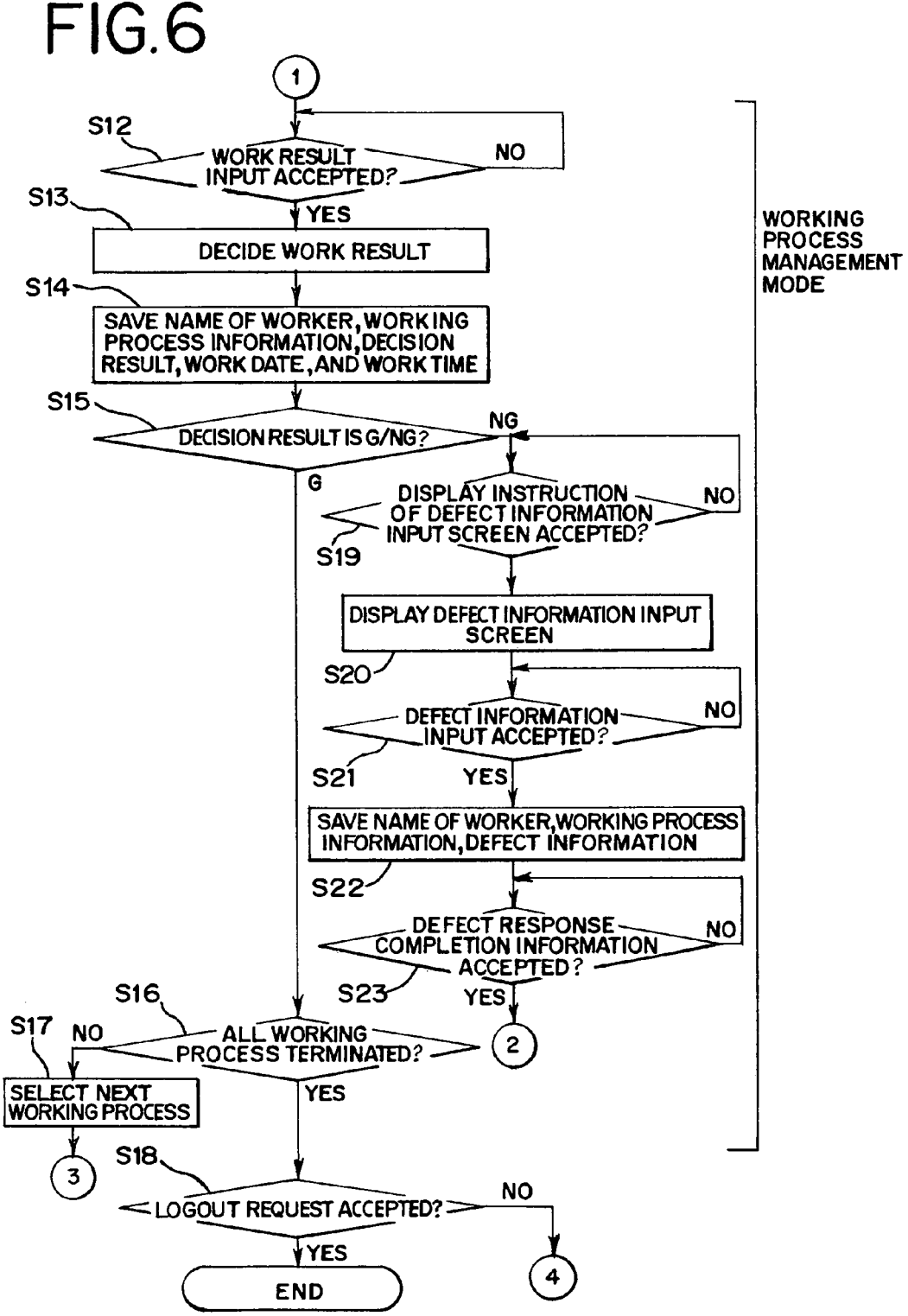
FIG. 6 is a second flowchart showing the processing procedure of the system.

FIGS. 5 and 6 show a flow of process by the present system. First, when accepting a login request (input of user ID, password) from a worker (step S1), the system performs user authentication (step S2).

If the system succeeds in authentication (step S3), the system accepts a work instruction code (step S4). The work instruction code is a code described in the work instruction manual distributed to each worker before work, and specifies the work in the production process to be carried out by each worker. The work instruction code is input from the keyboard 130a and the like.

Figure 7:
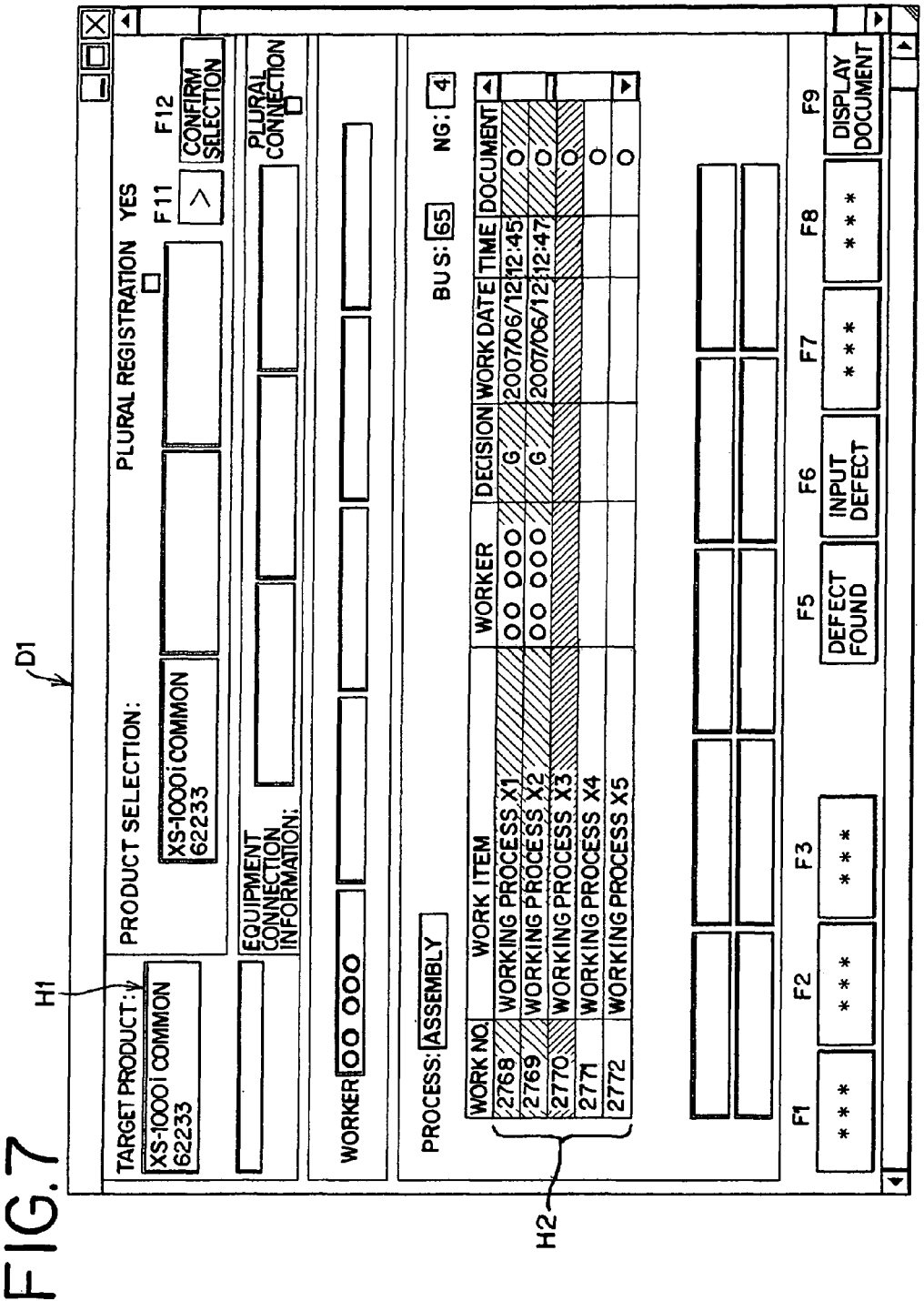
FIG. 7 is a view showing a working process management screen.

When the system accepts the work instruction code, the control unit 30 displays a working process management screen D1 shown in FIG. 7 by the working process management unit 10 of the system (step S5; start of working process management mode). A product name display section H1 of working target, a list display section H2 of the working process, and the like are displayed on the working process management screen D1.

The worker inputs the work start instruction of the working process to be performed through the input device such as the keyboard 130a or the foot lever 130c, and if the system accepts the same (step S6), the control unit 30 displays the work procedure image corresponding to the working process to be started on the display 120 by means of the work procedure image display unit 20 of the system (step S7; start of work procedure image display mode).

The work procedure image display unit 20 acquires one or a plurality of work procedure images (moving image or still image) corresponding to the relevant working process from the work procedure image database DB2, and sequentially displays the acquired image.

In the present embodiment, the working process management screen D1 (working process management mode) and the work procedure image (work procedure image display mode) are displayed in a switchable manner on the display 120, wherein the working process management screen D1 cannot be seen if the work procedure image is displayed, and the work procedure image cannot be seen if the working process management screen D1 is displayed. The worker can easily understand what to do by displaying the working process management screen D1 and the work procedure image in a switchable manner.

That is, the worker knows that system operation (working process management process) for working process management is to be performed since the system is in the working process management mode if the working process management screen D1 is displayed, and that work for production (assembly work etc.) is to be performed since the system is in the work procedure display mode if the work procedure image is displayed.

When a certain working process starts, the first work procedure image in the relevant working process is displayed on the display 120. If 1 to j work procedures exist in a certain working process (see FIG. 4), a total of j work procedure images is displayed for the relevant working process.

Specifically, the worker performs the work while looking at the work procedure image being displayed. After such work is completed, the worker operates the foot lever (completion input unit) 130c with foot, and performs completion input for terminating the display of the work procedure image to the system.

Since the completion input can be performed through operation of the foot in the present embodiment, the worker can continuously implement a series of work procedures without stopping the manual work for performing a plurality of work procedures in one working process by performing completion input of each work procedure by foot as necessary.

When completion input for the work procedure image other than the final work procedure image in the working process of the working target is made (step S9), the control unit 30 displays the work procedure image corresponding to the next work procedure in the relevant working process by the work procedure image display unit 20 (step S7).

The above processes are repeated, and the work procedure image in the relevant working process is sequentially displayed, and when accepting the completion input for the $j^{th}$ work procedure image (final work procedure image of the relevant working process; step S8) (step S10), the control unit 30 terminates the series of work procedure image display in the relevant working process (step S11; end of work procedure image display mode), and the working process management image D1 is switched and displayed in place of the work procedure image (start of working process management mode).

When the system becomes the working process management mode, the working process management unit 10 accepts the input of the work result of the terminated working process (step S12). The input of the work result may be made by having the worker input numerical values (dimension etc.) of the assembly result from the keyboard 130a etc., or the test result of the target product may be acquired through communication from a test function unit of the working target product as work result, or the test result may be acquired through communication from the device for testing the target product as work result.

Thereafter, the working process management unit 10 makes a decision on the acquired work result (step S13). The working process management unit 10 decides the acquired work result with a predetermined criterion, and generates a decision result of pass (G) or fail (NG).

Subsequently, the working process management unit 10 performs a working process management process of registering the fact that the working process is terminated along with the decision result in the production management database DB1 (step S14). In the present embodiment, the completion information of each working process to be registered in the production management database includes name of worker, working process information for specifying the working process, decision result, work date, and work (completed) time.

If the work result is pass (step S15), the next working process is selected by the worker (step S17), and when the work start instruction of the relevant working process is input (step S6), the first work procedure image of the next working process is displayed, and the work procedure image display mode is started. In the next working process as well, the work procedure images are sequentially displayed similar to the above (steps S7, S9), and when the completion input on the final work procedure image in the next working process is made (step S10), the work procedure image display mode is terminated, and the mode becomes the working process management mode.

The working process is carried out in the above manner, and when all of the working processes are completed (step S16), a new work may be started by accepting a new work instruction code (step S4), or log out may be carried out (step S18).

If the decision result of each working process is fail (NG), and the system accepts the display instruction of the defect information input screen from the worker (step S19), the working process management unit 10 displays the defect information input screen (not shown) on the display 120 (step S20).

In the defect information input screen, the worker may input defect phenomenon, cause of defect, and the like as defect information, and when the system accepts the defect information input (step S21), the defect information is registered in the production management database DB1 along with the work information indicating the name of the worker and the working process (step S22).

Subsequently, when the defect response completion information indicating that the response to the defect occurred in the working process is completed is input from the worker etc. to the system (e.g., click "defect response" button in the defect information input screen) (step S23), the work result="NG" of the relevant working process registered in the production management database DB1 is cleared, and the relevant working process again can be performed (step S5).

Therefore, if the work result is fail (NG), the relevant working process is repeated until the result becomes pass, and thus the defective articles can be reduced. Furthermore, when repeating the working process, the display of the work procedure image is also repeated, and thus a reliable task can be expected.

Figure 8:
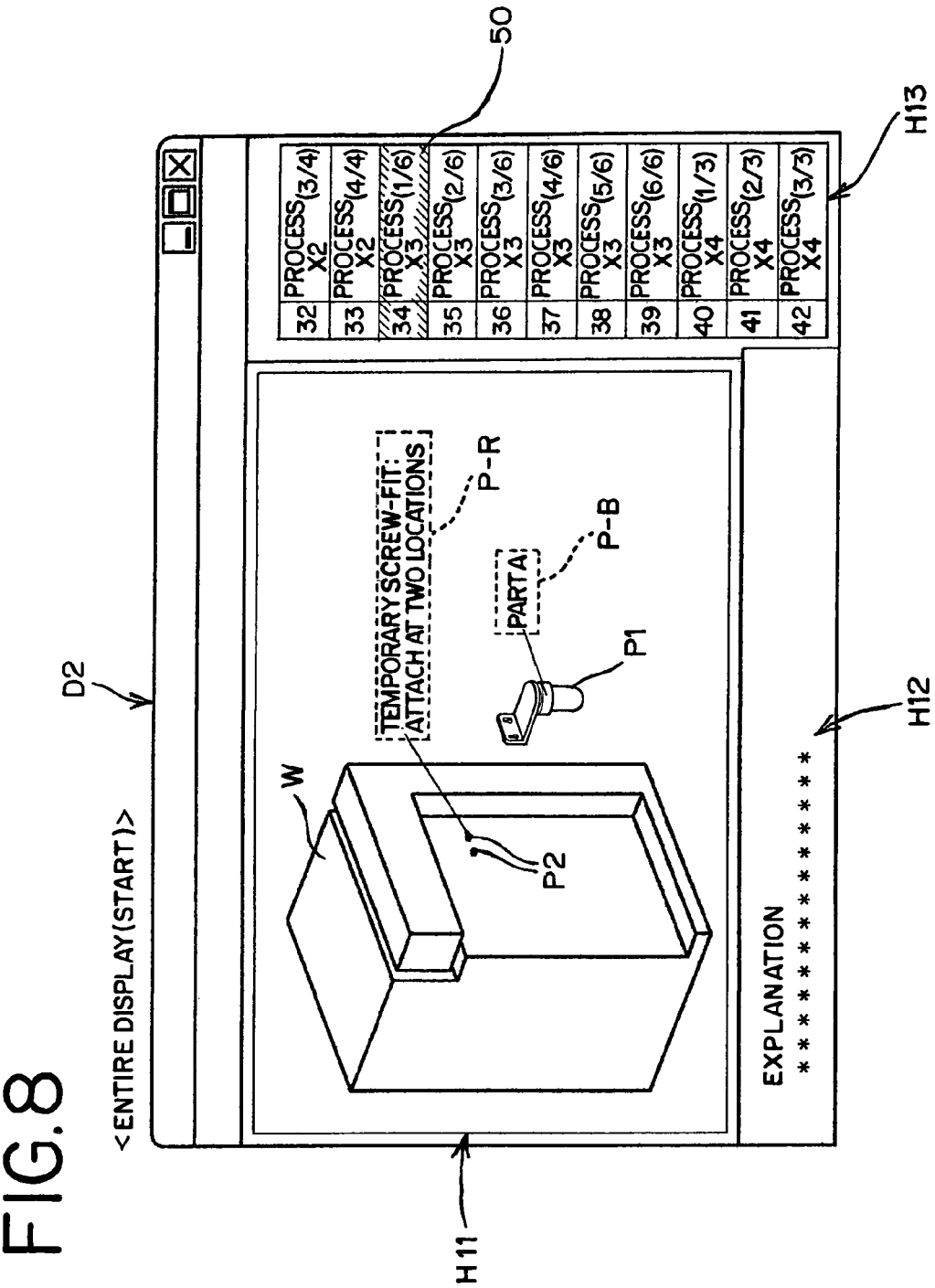
FIG. 8 is a view showing a work display screen (START image)

FIG. 8 shows the work display screen D2 for displaying the work procedure image in the work procedure image display mode. In the work display screen D2, the image display section H11 displaying the work procedure image, the explanation text display section H12 displaying the explanation text related to the displayed work procedure image, and the list display section H13 displaying a list of work procedures are arranged.

In the list display section H13, the work procedure of the working process of before or after the relevant working process is also displayed in addition to the work procedure corresponding to the working process being performed. A work procedure 50 corresponding to the work procedure image displayed on the image display section H11 is highlight displayed (highlighted) in the list display section H13, and is displayed so as to be distinguishable with other work procedures. The worker then can easily understand which work procedure is being executed of the series of work procedures.

Among the work procedures displayed in the list display section H13, an arbitrary work procedure can be selected from one or a plurality of work procedures corresponding to the working process being performed. The selecting operation is carried out by selecting one of the work procedures displayed on the list display section H13 with the mouse 130*b*.

In the completion input by the completion input unit 130*c*, the work procedure image is sequentially switched according to the work procedure, but when redoing the work, the worker can select the desired work procedure, so that the work procedure image display unit 20 can display the previous work procedure image etc., whereby the flexibility of display is enhanced.

However, the work procedure corresponding to the working process other the working process currently being performed cannot be selected, transition to a different working process without completing the current working process is prevented, and consistency with the production management can be maintained.

Figure 9:
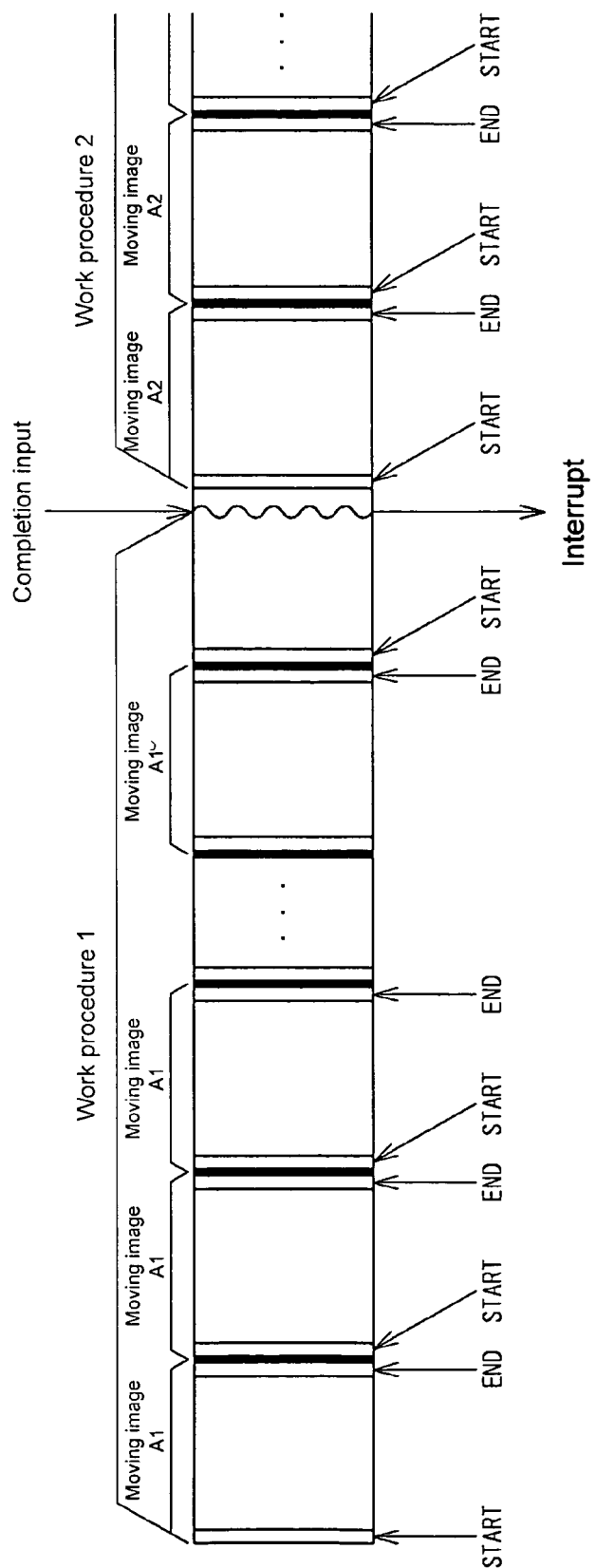
FIG. 9 is a view showing a repeated display of the work procedure image in each work procedure.

When the work procedure image display unit 20 displays a three-dimensional CG moving image having a predetermined image time in the work procedure image display of step S7 of FIG. 5, the three-dimensional CG moving image corresponding to the work procedure to be currently performed is automatically and repeatedly displayed until accepting the completion input (steps S9, S10). That is, as shown in FIG. 9, assuming the three-dimensional CG moving image corresponding to a certain "work procedure 1" is "moving image A1", the work procedure image display unit 20 repeatedly displays the "moving image A1" until the worker makes the completion input on the relevant "work procedure 1".

When the completion input (step S9) is made as completion instruction while repeatedly displaying the "moving image A1", the work procedure image display unit 20 interrupts the repeated display of the moving image A1 corresponding to the "work procedure 1", and starts to repeatedly display the moving image A2 corresponding to the next "work procedure 2".

Figure 10:
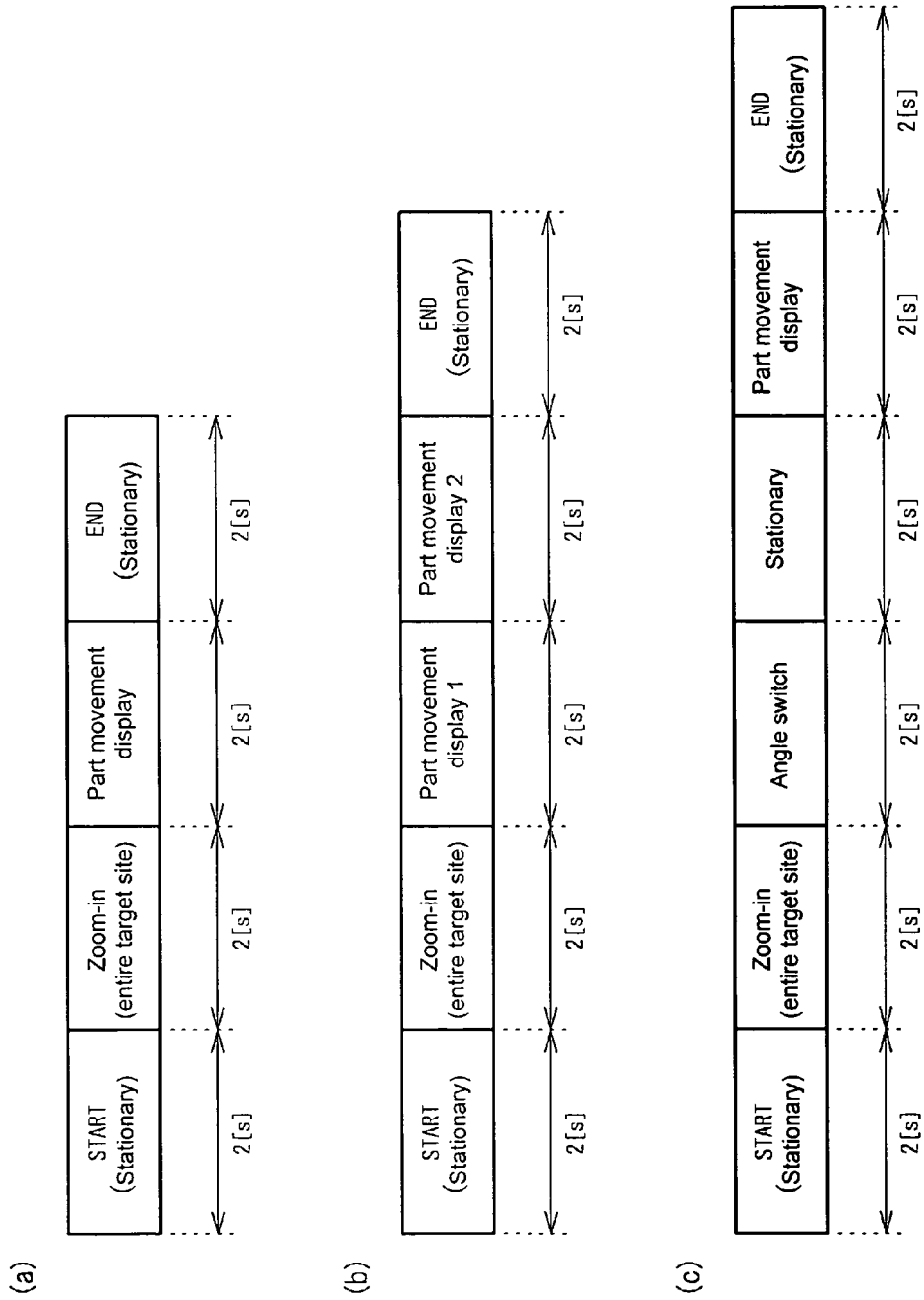
FIG. 10 is a view showing an image configuration of the work procedure image.

FIGS. 10A, B, and C show the image configuration of each of the plurality of work procedure images (three-dimensional CG moving image) contained in the working process.

In the case of the work procedure image shown in FIG. 10A, the image is configured by START image, zoom-in image, part movement display image, and END image. The work procedure image configured as shown in FIG. 10A includes a work procedure image corresponding to the work procedure (1/6) of the process X3 shown with the reference numeral 50 in FIG. 8. The work procedure is the work procedure of attaching the part A to the product body or the work object W with a screw, and the image display section H11 of FIG. 8 shows the START image of the work procedure image describing the relevant work procedure.

The work procedure image shown in FIG. 8 corresponds to START in FIG. 10A, and is the first portion in the three-dimensional CG moving image. In the START image of FIG. 8, the entire image of the product body or the work object W and the "part A" P1 to be attached to the work object W are displayed distant from the work object W. A screw P2 for temporarily screwing the "part A" to the work object W is also displayed in the work procedure image of FIG. 8.

In the START image shown in FIG. 8, the entire image of the work object W, and each parts P1, P2 to be attached are all displayed, and thus the worker can easily understand the working target as a whole.

Furthermore, in the START image, a temporal margin for the worker to understand the working target as a whole is ensured to display the entire image of the work object W etc. shown in FIG. 8 while being stationary for a predetermined time (two seconds). Furthermore, the stationary START image is the first portion of the repeatedly displayed work procedure image (three-dimensional CG moving image), and has a role of having the worker identify the start of work. Here, the display time of the START image is two seconds, but it is not limited thereto, and may be set to any time as long as the worker can identify the start of work. However, if the stationary time is too long, the work efficiency lowers and the worker needs to wait until the moving image starts, which becomes a load on the worker, and if the stationary time is too short, the worker may not be able to identify the start of work. Therefore, the stationary time is preferably around two seconds.

In the vicinity of the display of "part A" P1 and screw P2, the letters P-B, P-R explaining the two parts P1, P2 are also displayed with an outgoing line. The letters P-B, P-R are in different colors. Specifically, the letters P-B explaining the "part A" P1 are in black, and the letters P-R explaining the screw P2 are in red.

In the present system, the letters explaining the part contained in the image are differed for every type of parts P1, P2. Therefore, the display of the part itself in the image is small, and even if distinction of the mode of the part is difficult, the type of part can be understood from the color of the letter explaining the part.

In the work procedure image of FIG. 8, the zoom-in image is provided after the START image or the still image of a predetermined time (see FIG. 10A).

Figure 11:
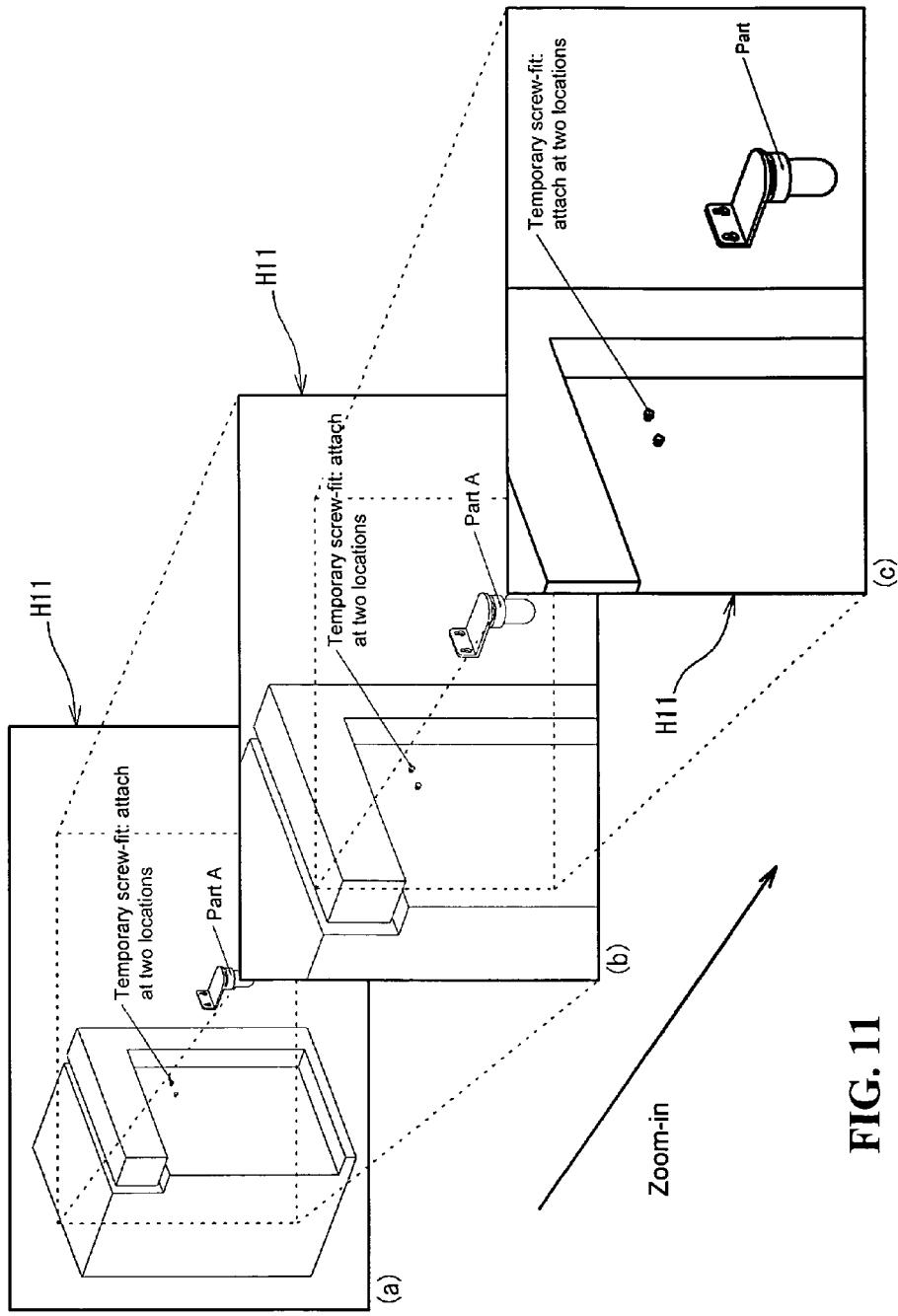
FIG. 11 is a view showing a zoom-in image.

As shown in the order of FIGS. 11A, B, and C, the zoom-in image zooms in to the working target site by continuously increasing the display enlargement magnification from the entire display shown in FIG. 8 so that the working target site (part to be attached, position of the product body to which the part is to be attached, or the vicinity thereof) of the work object is displayed in an enlarged manner.

According to the zoom-in image after the stationary START image for grasping the whole idea, the working target site important in the work can be explained in detail, and thus the work is facilitated.

The work object W and the part P1 are displayed in an enlarged manner, whereas the letters explaining the part P1 and other explanatory letters maintain the size (font) of the original letter irrespective of the zoom-in. The visibility is thus satisfactory as the sizes of the letters are not changed even during the zoom-in.

During the zoom-in, the parts P1, P2 maintain a state of being distant from the work object W, and the position relationship between the work object W and the parts P1, P2 is the same as in the START image. The image time of the zoom-in image is also two seconds. The display time of the zoom-in image is two seconds herein, but it is not limited thereto, and the display time may be appropriately set. However, if the stationary time is too long, the work efficiency lowers and the worker needs to wait until zoom-in is terminated, which becomes a load on the worker, and if the display time of the zoom-in image is too short, the worker may not be able to specify the working target site. Therefore, the display time is preferably around two seconds.

Figure 12:
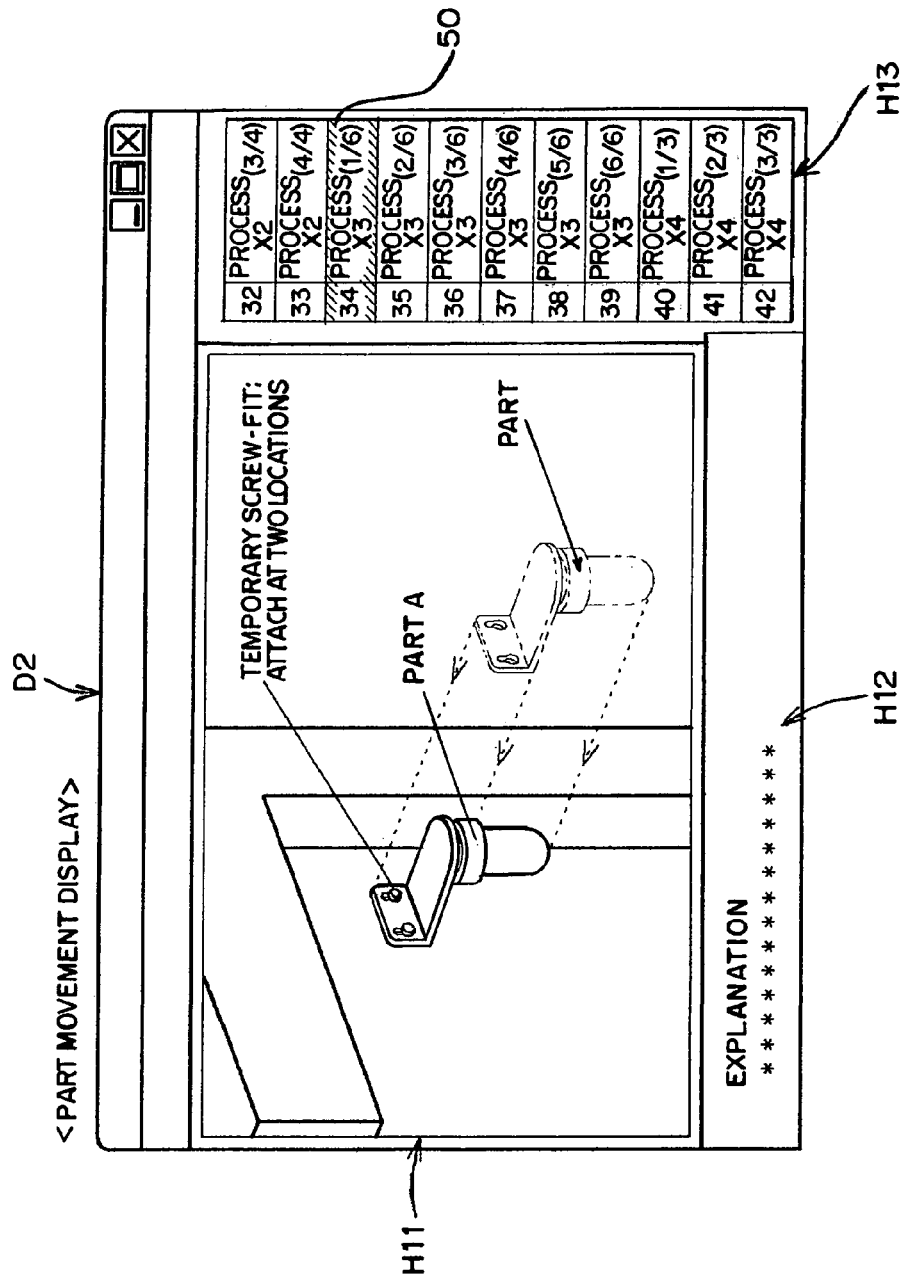
FIG. 12 is a view showing a part movement display image.
Figure 13:
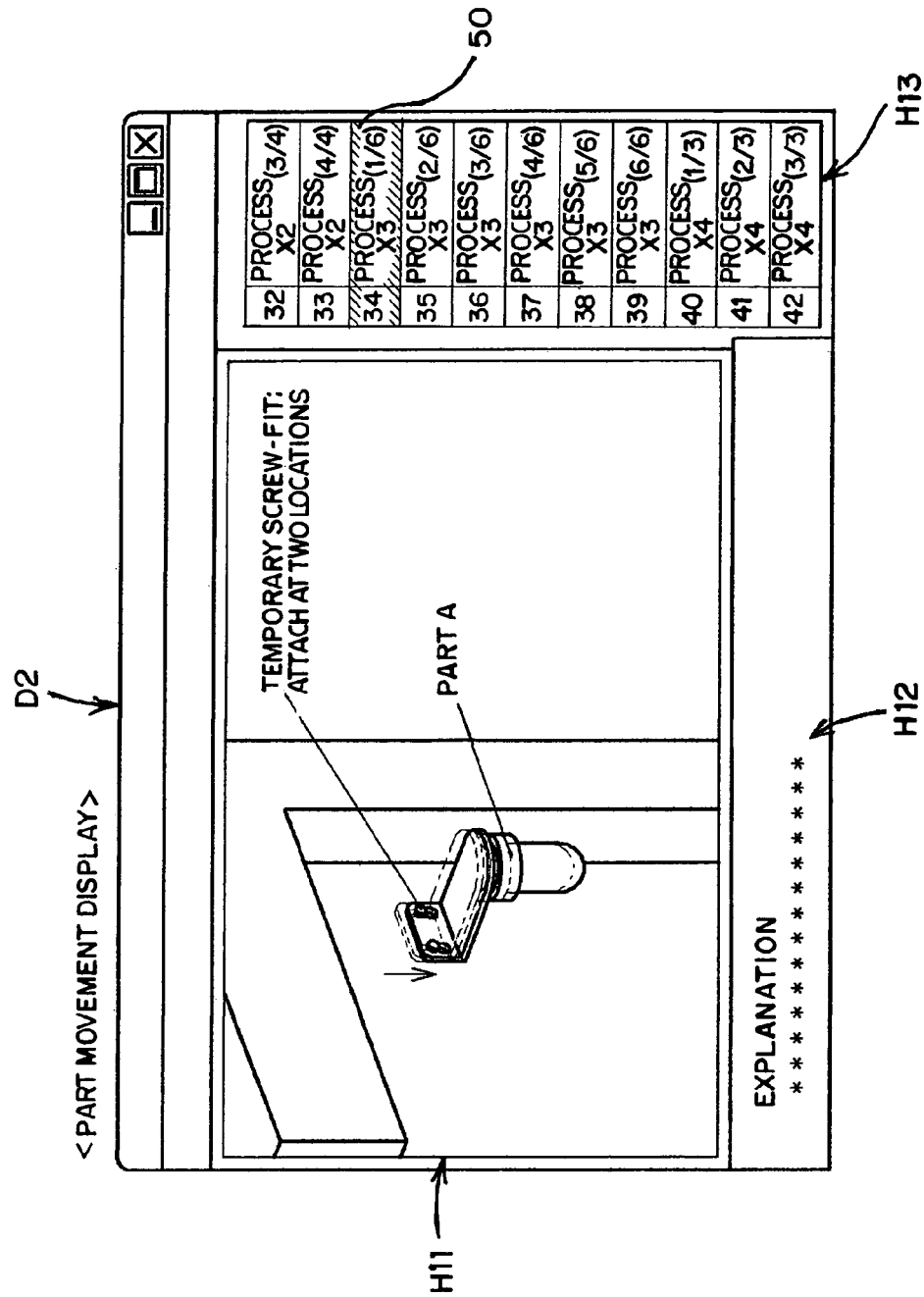
FIG. 13 is a view showing the part movement display image.

As shown in FIG. 10A, the part movement display image is provided after the zoom-in image. The part movement image displays a state in which the part A displayed at the position distant from the work object W is continuously moved to the attachment position of the work object W, as shown in FIGS. 12 and 13. According to the part movement image, the worker can easily recognize where and how to attach the part A.

In part movement, the letters P-B explaining the part also move with the part, and thus even if the moving part itself is displayed small, the worker can understand what the part is by the letters moving along with the part.

The image time of the part movement display image is also two seconds. In the present system, the time interval of the part movement display image in each three-dimensional CG moving image is set to a constant time (two seconds), and optimization of the moving image speed is achieved. The display time of the part movement display image may be other than two seconds, or the display time may be differed for every part movement display image. However, if the display time is differed for every part movement display image, the display time may be too long and the work efficiency may lower for some images, and if the display time is too short, the worker may not understand the movement of the part, and thus the part movement display is preferably displayed for a constant time. Even when the part movement display is a constant time, if the display time is too long, the work efficiency lowers and the worker needs to wait until the movement is terminated, which becomes a load on the worker, and if the display time is too short, the worker may not be able to recognize the movement of the part. Therefore, the display time is preferably around two seconds.

Figure 14:
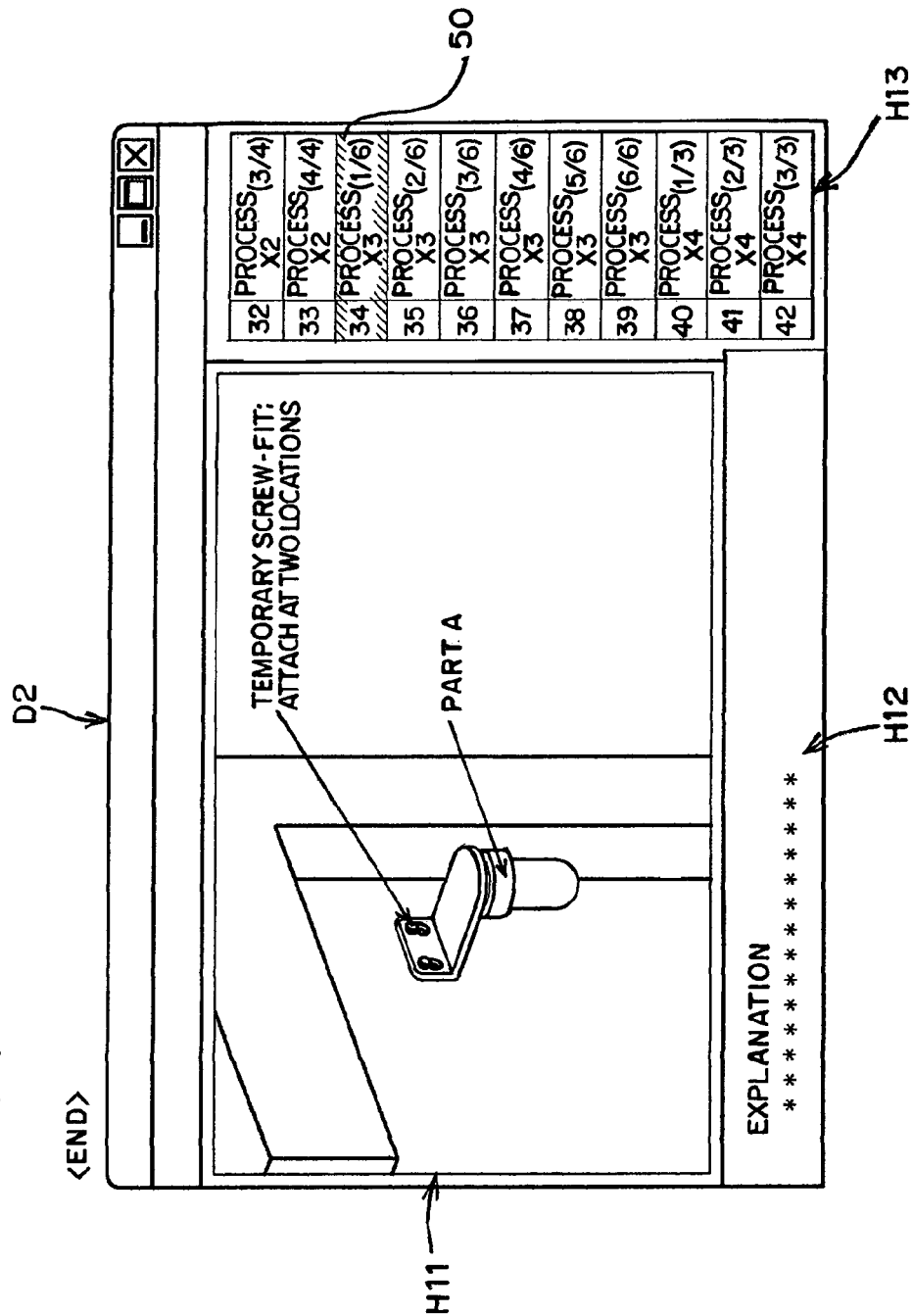
FIG. 14 is a view showing an END image.

Furthermore, as shown in FIG. 10A, the END image is provided after the part movement display image. The END image is the final portion in the three-dimensional CG moving image of the working process X3 (1/6). The END image shows the state in which the part A is attached to the work object W by the part movement image in the stationary state, as show in FIG. 14.

In the END image, the state after attachment of the part A is displayed in the stationary state, and thus the worker can easily recognize the state after attachment.

Furthermore, the stationary END image is the final portion of the repeatedly displayed work procedure image (three-dimensional CG moving image), and enables the worker to identify the end of the work. The image time of the END image is also two seconds. The display time of the END image is two seconds herein, but it is not limited thereto, and may be set to any time as long as the worker can identify the end of the work. The reason the display time is preferably two seconds is the same as in the display time of the START image.

The work procedure image or the three-dimensional CG moving image includes the START image and the END image displayed in a stationary state, as described above, and thus the worker can recognize the start and the end of the work in the work procedure even if the moving image showing the same work procedure is continuously and repeatedly displayed in one work procedure, as shown in FIG. 9.

FIG. 10B shows an example of another image configuration of the work procedure image or the three-dimensional CG moving image. In the work procedure image of FIG. 10B, the part movement display of two parts is performed, and thus "part movement display 1" (two seconds) of a certain part is performed, and thereafter, "part movement display 2" (two seconds) of another part is performed. The image time of each part movement display is the same. Other points are the same as the image of FIG. 10A.

FIG. 10C shows another further example of another image configuration of the work procedure image or the three-dimensional CG moving image. In the work procedure image of FIG. 10C, switching of display angle is performed after the zoom-in image. When displaying the working target site in an enlarged manner and performing the part movement display etc., the display angle preferably coincides with the line of sight of when the worker sees the actual work object from the standpoint of workability.

However, the appropriate display angle and the line of sight of the worker do not necessarily coincide in zoom-in image. Thus, angle switching is appropriately performed as in FIG. 10C, so that the display angle of the image coincides with the line of vision of the worker.

Even after angle switching, the first image of the three-dimensional CG moving image after display angle switching is displayed in a stationary manner for a predetermined time (two seconds), similar to the START image or the END image. According to such stationary display, a state in which the working target site and the line of sight of the worker are coincided can be maintained and displayed for a predetermined time, whereby the worker can easily check the position of the working target site of after angle switching.

The switching of the display angle does not need to be performed after the zoom-in image, and may be performed in other cases (e.g., between part movement display 1 and part movement display 2 of FIG. 10B).

Figure 15:
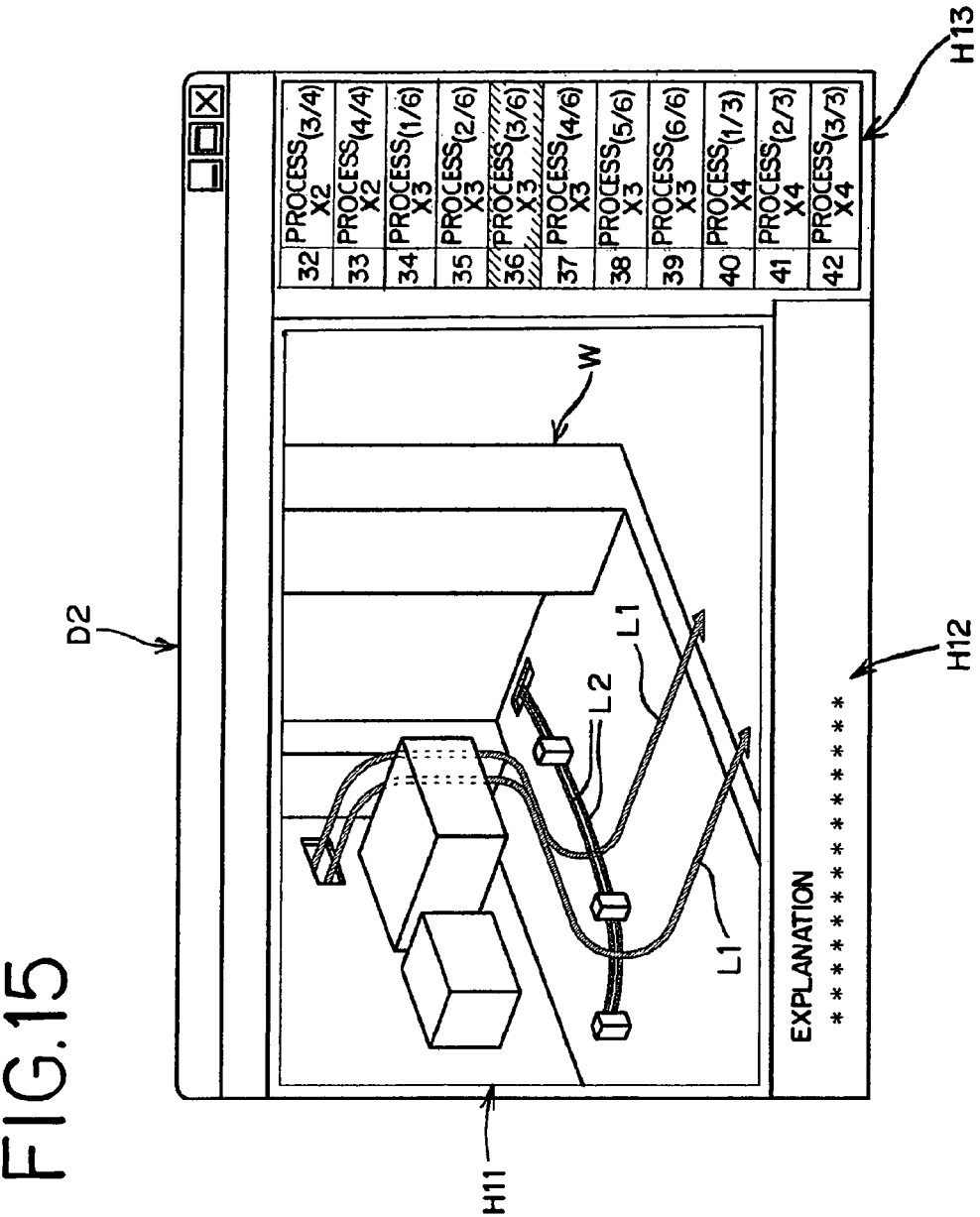
FIG. 15 is a view showing another work procedure image.

FIG. 15 shows a work procedure image (three-dimensional CG moving image) different from the previously described work procedure image. The work procedure image of FIG. 15 is an image describing another work procedure (3/6) in the working process X3 same as the previously described work procedure image. This work procedure image shows the END image.

In this work procedure image, a piping L1 and a wiring (electrical wiring) L2 to be installed in the work object W are shown, and a method of drawing the piping L1 is displayed as a moving image while showing the position relationship with the wiring L2.

The piping L1 and the wiring L2 are represented by CG and are represented as a line, and thus are difficult to be distinguished by the worker. In the present embodiment, the color of the piping (e.g., blue) and the color of the wiring (e.g., black) are differed, so that the worker can easily distinguish the wiring and the piping.

The differing in colors of the piping and the wiring may be carried out in the START image described in FIG. 8 and the like, or may be carried out in the part movement display.

In the present embodiment, a configuration of displaying the procedure of the product work of a product in a three-dimensional CG moving image has been described, but it is not limited thereto, and the procedure of the repair work of the product or the procedure of the maintenance work of the product may be displayed in three-dimensional CG moving image. In the repair work or some maintenance work of the product, the product needs to be dissembled, the necessary part needs to be replaced, and the product again needs to be assembled, and thus the procedure for dissembling, the procedure for replacing the part, and the procedure for assembling the product are displayed in a three-dimensional CG moving image. In the maintenance work of the product, the work of replacing consumable goods of the product, and the like are displayed in a three-dimensional CG moving image.

The present invention is not limited to the above described embodiment, and various modifications may be made without departing from the scope thereof.

What is claimed is:

1. A work procedure display method of displaying by a computer a procedure of work to be performed on a work object, the method comprising:
    (a) displaying an entire image of the work object so that a start of the work is recognizable by a user;
    (b) increasing a display magnification of the work object so that a target area of the work object to be worked on is displayed in an enlarged manner;
    (c) displaying a moving image showing the procedure of the work in such a manner that a part to be attached to the work object moves from a position distant from the work object towards a position of being attached to the work object, with the text describing the part, the text being displayed in a color different from a color of the part in such a manner as to move along with the part;
    (d) displaying an image for the user to recognize an end of the work; and
    (e) accepting an instruction to complete the work; wherein steps (a) to (d) are repeatedly executed until the instruction to complete the work is accepted.

2. The work procedure display method according to claim 1, wherein step (a) comprises a step of displaying a still image showing the entire image of the work object for a predetermined time.

3. The work procedure display method according to claim 1, wherein the image displayed in step (d) is a still image showing a state in which the part to be attached is attached to the work object, and the still image is displayed for a predetermined time.

4. The work procedure display method according to claim 1, wherein step (c) comprises a step of displaying a plurality of types of moving images showing the procedure of the work for a period of time equal among the plurality of types of moving images.

5. The work procedure display method according to claim 4, wherein a time in which step (a) is executed, a time in which step (b) is executed, and a time in which step (d) is executed are equal to a time in which one moving image is displayed in step (c).

6. The work procedure display method according to claim 1, wherein the image displayed in step (d) is a still image showing a state in which piping and electrical wiring to be attached are attached to the work object, and the piping and the electrical wiring are displayed in different colors to each other.

7. A work procedure display system, for displaying a procedure of work to be performed on a work object by displaying a moving image, including a memory under control of a processor of a computer system, the memory storing instructions enabling the processor to carry out operations comprising the steps of:
    (a) displaying an entire image of the work object so that a start of the work is recognizable by a user;
    (b) increasing a display magnification of the work object so that a target area of the work object to be worked on is displayed in an enlarged manner;
    (c) displaying a moving image showing the procedure of the work in such a manner that a part to be attached to the work object moves from a position distant from the work object towards a position of being attached to the work object, with the text describing the part, the test being displayed in a color different from a color of the part in such a manner as to move along with the part;
    (d) displaying an image for the user to recognize an end of the work; and
    (e) accepting an instruction to complete the work; wherein steps (a) to (d) are repeatedly executed until the instruction to complete the work is accepted.

8. The work procedure display system according to claim 7, further comprising:
    a server computer including the memory; and
    a plurality of terminal computers connected to the server computer.

9. A computer program product, comprising: a computer readable medium that stores instructions, adapted to enable a processor of a computer system to display a procedure of work to be performed on a work object, the instructions further adapted to enable the processor to perform operations comprising:
    (a) displaying an entire image of the work object so that a start of the work is recognizable by a user;
    (b) increasing a display magnification of the work object so that a target area of the work object to be worked on is displayed in an enlarged manner;
    (c) displaying a moving image showing the procedure of the work in such a manner that a part to be attached to the work object moves from a position distant from the work object towards a position of being attached to the work object, with the text describing the part, the test being displayed in a color different from a color of the part in such a manner as to move along with the part;
    (d) displaying an image for the user to recognize an end of the work; and
    (e) accepting an instruction to complete the work; wherein steps (a) to (d) are repeatedly executed until the instruction to complete the work is accepted.

* * * * *

UNITED STATES PATENT AND TRADEMARK OFFICE
CERTIFICATE OF CORRECTION

PATENT NO.         : 8,074,182 B2                                    Page 1 of 1
APPLICATION NO.    : 12/218596
DATED              : December 6, 2011
INVENTOR(S)        : Takayo Maeda et al.

It is certified that error appears in the above-identified patent and that said Letters Patent is hereby corrected as shown below:

In the Claims

In column 14, claim 7, line 14, after "describing the part, the" replace "test" with --text--.
In column 14, claim 9, line 42, after "describing the part, the" replace "test" with --text--.

Signed and Sealed this
Eighth Day of May, 2012

David J. Kappos
*Director of the United States Patent and Trademark Office*